(12) United States Patent
Arosio

(10) Patent No.: US 6,588,806 B2
(45) Date of Patent: Jul. 8, 2003

(54) FLAT-FACE QUICK COUPLING

(75) Inventor: Massimo Arosio, Rivolta d'Adda (IT)

(73) Assignee: Faster, S.r.l., Rivolta d'Adda (IT)

( * ) Notice: Subject to any disclaimer, the term of this patent is extended or adjusted under 35 U.S.C. 154(b) by 0 days.

(21) Appl. No.: 09/918,357

(22) Filed: Jul. 30, 2001

(65) Prior Publication Data

US 2002/0014770 A1 Feb. 7, 2002

(30) Foreign Application Priority Data

Jul. 31, 2000 (IT) ........................... MI2000A1770

(51) Int. Cl.[7] ................................. F16L 37/28
(52) U.S. Cl. ................. 285/306; 285/924; 285/307; 285/13
(58) Field of Search ................. 285/306, 307, 285/102, 924, 13, 14; 137/614.02, 614.05, 614.06; 251/149.6

(56) References Cited

U.S. PATENT DOCUMENTS

| | | | | |
|---|---|---|---|---|
| 3,791,411 A | * | 2/1974 | Bogeskov et al. | 137/614.02 |
| 3,809,122 A | * | 5/1974 | Berg | 137/614.06 |
| 4,077,433 A | * | 3/1978 | Maldavs | 137/614.04 |
| 4,303,098 A | * | 12/1981 | Shindelar | 137/596.2 |
| 4,350,321 A | * | 9/1982 | Berg | 137/614.03 |
| 4,394,874 A | * | 7/1983 | Walter | 137/614.02 |
| 4,598,896 A | * | 7/1986 | Maldavs | 137/454.2 |
| 5,730,185 A | * | 3/1998 | Wilkins et al. | 137/614.05 |
| 5,937,899 A | * | 8/1999 | Zeiber | 137/614 |
| 6,412,828 B1 | * | 7/2002 | Lacroix et al. | 285/316 |

* cited by examiner

Primary Examiner—Eric K. Nicholson
(74) Attorney, Agent, or Firm—Kirschstein, et al.

(57) ABSTRACT

A radially offset valve is mounted in a bypass passage that extends through two movable members that are jointly moved during coupling between two couplers. The valve is moved from a closed position in which the flow of a pressurized fluid through a flow channel of an outer tubular body is prevented from being discharged through a discharge passage, to an open position in which the fluid is permitted to flow to the discharge passage, thereby resisting fluid leakage to the environment during coupling.

9 Claims, 2 Drawing Sheets

FLAT-FACE QUICK COUPLING

BACKGROUND OF THE INVENTION

The present invention relates to a flat-face quick coupling.

Flat-face quick couplings, comprising a male element which can be coupled to a female element are already known in the prior art.

Said prior quick couplings are used in several field and, in particular, for coupling working assemblies, driven by a pressurized hydraulic fluid, to an apparatus provided for supplying the pressurized hydraulic fluid.

A typical field use of the above mentioned flat-face quick couplings is, for example, that of agricultural machines, or specially devised machines for making or servicing roads.

For example, in the agricultural machine fields, the mentioned quick couplings are used for coupling auxiliary equipment to a towing vehicle, such as a tractor.

Prior flat-face quick couplings have been found as very useful and operatively efficient, mainly due to the fact that, as they are clutched, no undesired oil leakage occurs, and, accordingly, the environment is not polluted thereby.

However, a drawback of said prior flat-face quick couplings is that they, because of their lacking of any oil leakages, do not allow to fully reduce the oil pressure inside the coupling: thus, it is not possible to connect two quick couplings as remaining inner pressures are still present in the hydraulic system.

Therefore, the devices receiving the flat-face quick couplings are considered by a user as defective or failed.

Consequently, the user frequently attempts to connect the two devices including the mentioned flat-face quick couplings by applying comparatively large forces which could seriously damage said couplings, with a consequent leakage of the hydraulic fluid.

SUMMARY OF THE INVENTION

Accordingly, the aim of the present invention is to provide an improved flat-face quick coupling which can be clutched without any oil leakages and without the need of overcoming remaining pressures inside said quick coupling.

According to one aspect of the present invention the above mentioned aim is achieved by a flat-face quick coupling, comprising an outer tubular body and a bushing threaded in the tubular body for receiving, in an axially displaceable manner, a tubular element coupled, in a per se known way, to means for providing a flat-face quick coupling, by providing that the tubular element is rigid with a tubular body which, on an outer circumference thereof, comprises sealing ring elements, that through a body of tubular element a throughgoing hole is formed, which, through a cross hole communicates with a chamber of the quick coupling, that the throughgoing hole has a valve seat which can be shut-off by a valve stem preloaded by a spring, that the valve stem comprises an extension projecting into a chamber formed between the tubular body and tubular body, and that from the chamber extends a throughgoing hole connected to a discharging fitting.

Thus, by using such a quick coupling it is possible, by actuating a tubular element of the coupling, to open the outlet valve provided inside the coupling, thereby fully discharging the hydraulic fluid while fully eliminating residual or remaining pressures inside the coupling.

BRIEF DESCRIPTION OF THE DRAWINGS

The quick coupling according to the present invention will be disclosed in a more detailed manner hereinafter with reference by an embodiment thereof, given only by way of an example, and illustrated in the accompanying drawings, where.

DESCRIPTION OF THE PREFERRED EMBODIMENT

Figure 1:
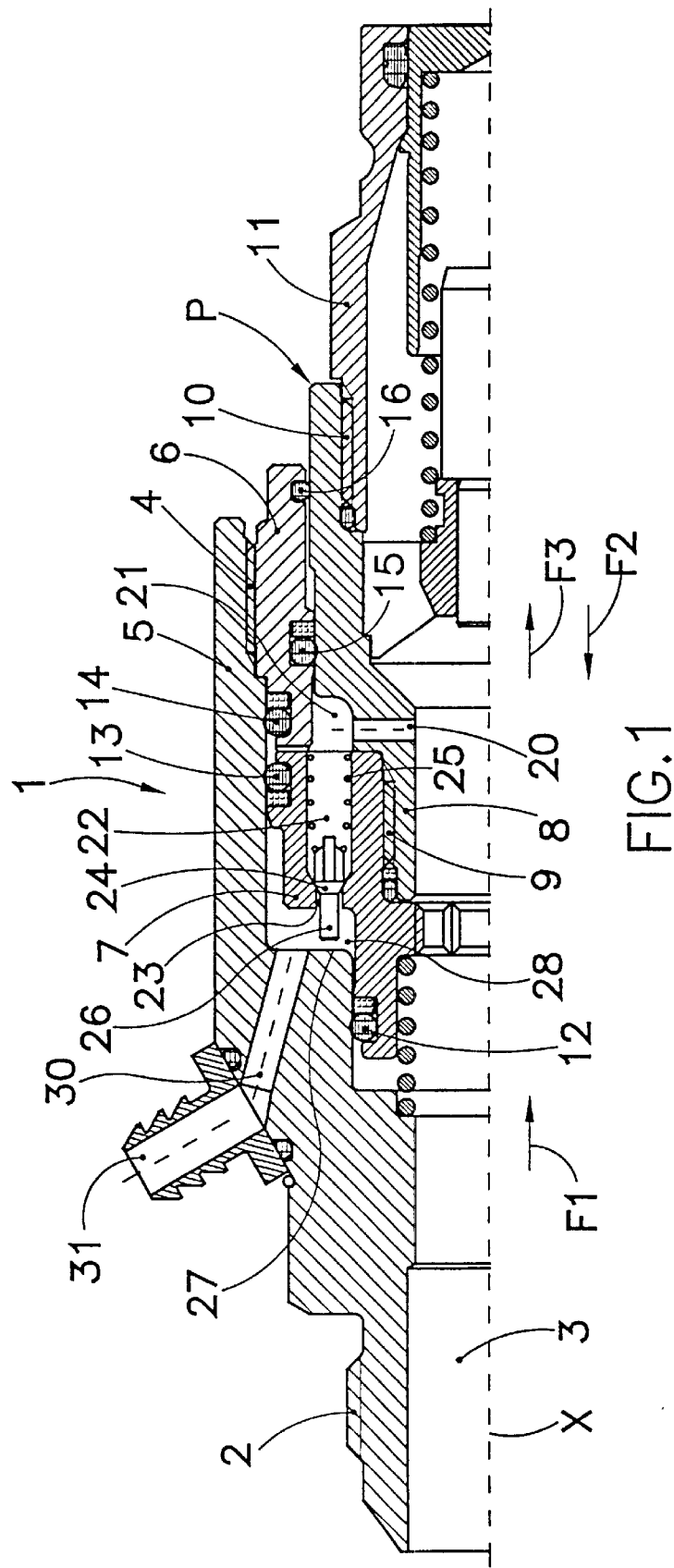
FIG. 1 shows a quick coupling of a male type, in a use position thereof.
Figure 2:
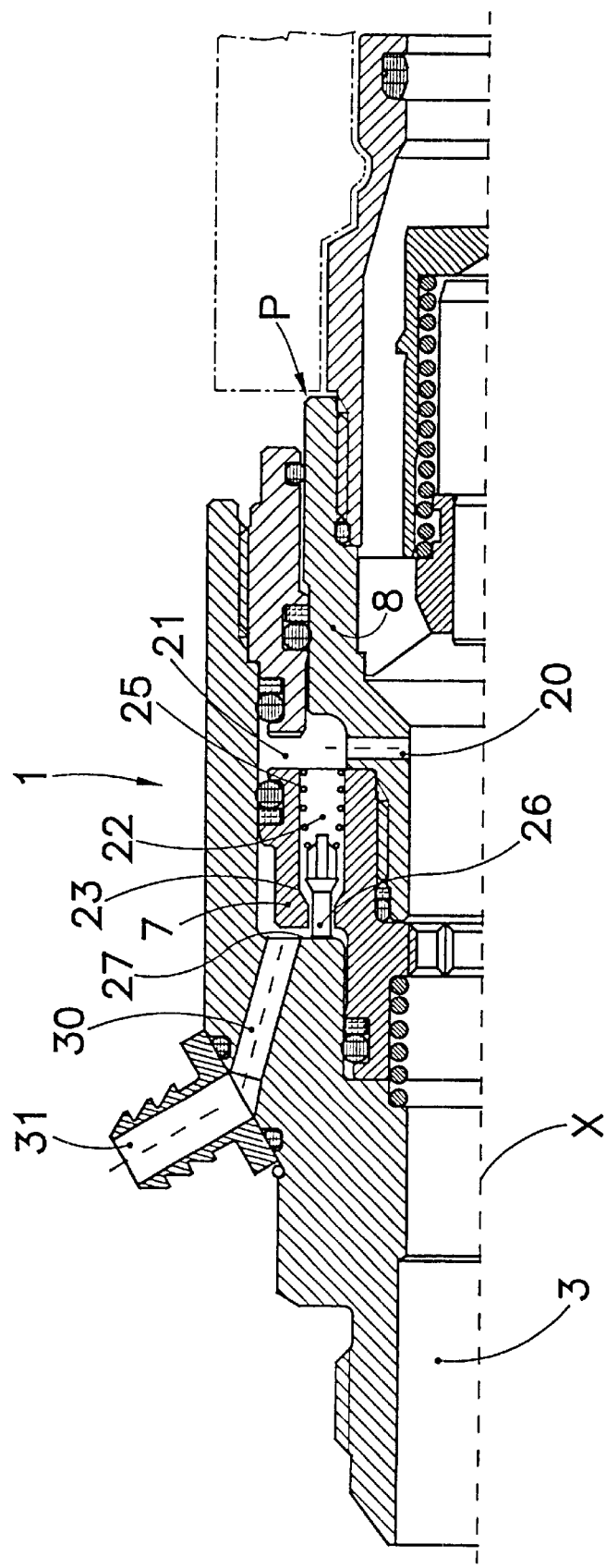
FIG. 2 shows the quick coupling during an operating clutching step thereof.

For simplicity, FIGS. 1 and 2 illustrates only a flat-face quick coupling of a male type; it should be however apparent that the inventive concept could also be applied to a female type of quick coupling.

In FIG. 1, the flat-face quick coupling has been generally indicated by 1.

As stated, such a quick coupling is already known in the prior art and is provided with a threaded fitting 2 designed for providing a mechanical connection, for example with the body of a manifold, to which a pressurized hydraulic fluid is supplied, said pressurized fluid flowing into a main chamber 3.

The quick coupling comprises a tubular body 5 to which, by an inner thread 4 formed at the front end of said tubular body 5, is coupled a bushing 6, followed by a tubular body 7 which, in turn, is coupled by a thread 9 to a frontward projecting tubular body 8.

In said tubular body 8 is threaded, by a thread 10, an extension 11, of a per se known type, operating as a male coupling element.

As shown in the drawing, between the tubular element 7 and outer tubular body 5, and the bushing 6 and outer tubular body 5, ring sealing elements, indicated by 12, 13 and 14 are provided.

Further sealing elements 15 and 16 are arranged between the body of the bushing 6 and the outer circumference of the tubular body 8.

Of the above sealing elements, the sealing elements 12, 13 and 15 have a very important function.

Furthermore, the flat-face quick coupling comprises, between the tubular body 7 and inner wall of the tubular body a ring seal 13, between the bushing 6 and inner wall of the tubular body 5 a further ring seal 14, between the tubular body 7 and tubular body 5 yet another ring seal 12 and, finally, between the bushing 6 and body of the tubular element 8 yet another ring seal or gasket 15.

The ring seal 12 is affected, because of the hydraulic pressure present in the main chamber 3, by a force F1.

The ring seal 13 is affected by a force F2 opposite to the force F1 and, finally, through a throughgoing hole 20 formed through the body of the tubular element 8, the seal 15 is affected by a force F3, due to the pressurized hydraulic fluid, which force is opposite to the force F2.

Based on the equation:

$$F1+F3=F2$$

an advantageous balancing of the hydrostatic forces F1, F2 F3 inside the quick coupling is obtained, thereby the tubular element 8 can be driven without any obstacle, as it is urged by a force P, together with the tubular element 7 inside the body 5 of the quick coupling 1.

The passage 20 extending from the tubular chamber 3 through the tubular body 8 leads to a chamber 21 defined by the tubular body 8 and the bushing 6 body.

The chamber 21 communicates with a further chamber 22 formed in the tubular body 7 and axially extending of said body 7.

The chamber 22 has an opening 23, operating as a valve seat, receiving therein a valve stem 24, preloaded by a spring means 25 and pressed against the valve seat, which, advantageously, is a tapering valve seat.

The valve element 24 comprises an extension 26 projecting toward a wall 27 which is arranged perpendicularly to the axis X of the valve body 1.

The wall 27 defines an annular chamber 28, formed inside the tubular body 5 and delimited by the tubular body 7.

A passage 30 extends from the chamber 28, through the body 5, seat passage leading to a fitting 31 which can be coupled to a pipe (not shown) in turn leading to a hydraulic fluid collecting tank (not shown).

For connecting the male coupling 1, shown in FIGS. 1 and 2, to a female coupling, not shown but known from the prior art, the tubular element 8 is slightly pressed by a light pressure P, thereby axially driving, without any substantial resistance, said tubular element 8 together with the tubular element 7 which will be displaced inside the valve body 1, to bring the valve stem 26 to contact the wall 27, thereby causing the valve 23, 26 to be opened against the urging of the spring 25.

Thus, the residual hydraulic fluid, present in the tubular chamber 3, can be discharged through the hole 20 to the chamber 21, and it will flow from the latter through the chamber 22 and the valve opening 23, to the throughgoing hole 30, to arrive at the fitting 31, the related pipe (not shown) and the hydraulic fluid central tank of the vehicle.

Thus, since the remaining hydraulic pressure can be fully released from the tubular chamber 3 of the quick coupling 1, it will be consequently possible to connect the quick coupling 1, of male type, to a female type of quick coupling, without any oil leakage and the requirement of applying any substantial force to the components of the flat-face quick couplings.

What is claimed is:

1. A hydraulic coupling arrangement, comprising:
   a) an outer, tubular body extending along a longitudinal axis and having a flow channel through which a pressurized fluid flows, and a discharge passage for discharging the fluid during coupling;
   b) a tubular bushing mounted at an axial end region of the body;
   c) an inner, tubular, first movable member mounted on the bushing for axial movement when subjected to an axially-directed force during coupling;
   d) a coupler mounted at an axial end region of the first movable member;
   e) an inner, tubular, second movable member connected to the first movable member for joint movement therewith;
   f) a bypass passage extending between the flow channel and the discharge passage through the first and second movable members; and
   g) a radially offset valve mounted in the second movable member within the bypass passage for movement along an offset axis parallel to the longitudinal axis between a closed position in which the valve blocks the flow of the fluid to the discharge passage, and an open position in which the valve enables the fluid to flow to the discharge passage during coupling.

2. The arrangement of claim 1, and a fitting mounted on the body and being in fluid flow communication with the discharge passage.

3. The arrangement of claim 1, wherein the body has a threaded portion for connection to a source of the pressurized fluid.

4. The arrangement of claim 1, and fluid seals located between the first and second, movable members and the body and the bushing.

5. The arrangement of claim 1, wherein the bypass passage includes a radial passage portion extending radially through the first movable member, and an axial passage portion extending along the offset axis through the second movable member.

6. The arrangement of claim 1, wherein the valve has a projection extending along the offset axis and abutting a wall of the body to move the valve to the open position during coupling.

7. The arrangement of claim 6, wherein the wall is perpendicular to the longitudinal axis.

8. The arrangement of claim 1, and a return spring for constantly biasing the valve to the closed position.

9. The arrangement of claim 1, and a restoring spring for constantly biasing the first and second, movable members to resist the axially-directed force exerted during coupling.

* * * * *